(12) United States Patent
Willis (10) Patent No.: US 7,495,642 B2
(45) Date of Patent: Feb. 24, 2009

(54) SEQUENTIAL MULTI-SEGMENT PULSE WIDTH MODULATED DISPLAY SYSTEM

(75) Inventor: Donald Henry Willis, Indianapolis, IN (US)

(73) Assignee: Thomson Licensing, Boulogne Billancourt (FR)

( * ) Notice: Subject to any disclaimer, the term of this patent is extended or adjusted under 35 U.S.C. 154(b) by 508 days.

(21) Appl. No.: 10/542,468

(22) PCT Filed: Jul. 7, 2003

(86) PCT No.: PCT/US03/20993

§ 371 (c)(1),
(2), (4) Date: Jul. 15, 2005

(87) PCT Pub. No.: WO2004/068461

PCT Pub. Date: Aug. 12, 2004

(65) Prior Publication Data

US 2006/0082601 A1   Apr. 20, 2006

Related U.S. Application Data

(60) Provisional application No. 60/440,733, filed on Jan. 17, 2003.

(51) Int. Cl.
*G09G 3/23* (2006.01)

(52) U.S. Cl. .............................. 345/89; 345/63; 345/77; 345/87; 345/94; 345/204

(58) Field of Classification Search ................... 345/63, 345/77, 84, 89, 94, 98, 204, 208, 209, 617; 348/598, 599; 383/275
See application file for complete search history.

(56) References Cited

U.S. PATENT DOCUMENTS 5,448,314 A * 9/1995 Heimbuch et al. .......... 348/743

(Continued)

FOREIGN PATENT DOCUMENTS

| EP | 0896317 A2 | 2/1999 |
|----|------------|--------|
| JP | 7-264515 | 10/1995 |

OTHER PUBLICATIONS

Copy of Search Report dated Sep. 28, 2003.

(Continued)

*Primary Examiner*—Bipin Shalwala
*Assistant Examiner*—Vince E Kovalick
(74) *Attorney, Agent, or Firm*—Joseph J. Laks; Harvey D. Fried; Patricia Verlangieri (57) ABSTRACT

A field sequential pulse width modulated display system comprises a digital micromirror device (DMD) having a plurality of micromirrors that each selectively pivot to reflect light onto a screen to illuminate a corresponding pixel. A driver circuit controls the DMD responsive to sequences of pulse width segments formed by a processor. The processor actuates at least one pulse in a first pulse width segment for a given color to increase pixel brightness with a range lying between first and second pixel brightness values. To further increase pixel brightness, the processor actuates at least one pulse within additional pulse width segments associated with the same given color to increase pixel brightness above the second brightness boundary. The pulses within the additional segments are actuated unequally so that the additional pulse width segments closest in time to the first segment (i.e., the segment first in brightness) have a greater total duration of actuated pulses for a given pixel brightness compared to the additional pulse width segments farther in time from the first segment. Actuating the pulses in this manner serves to: (a) limit the time dispersal of darker objects within a picture, (b) minimize the light redistribution between time segments for incremental brightness changes, and (c) taper up and down light intensity for the sequence of pulse width segments for a given picture, all to minimize motion artifacts.

8 Claims, 8 Drawing Sheets

U.S. PATENT DOCUMENTS

| | | | |
|---|---|---|---|
| 5,777,589 A * | 7/1998 | Gale et al. | 345/84 |
| 5,909,204 A * | 6/1999 | Gale et al. | 345/85 |
| 6,377,234 B1 * | 4/2002 | Nogawa | 345/89 |
| 6,590,549 B1 * | 7/2003 | Marshall | 345/84 |
| 2003/0122494 A1 * | 7/2003 | Ide | 315/169.3 |
| 2003/0193514 A1 * | 10/2003 | Huang | 345/694 |

OTHER PUBLICATIONS

Hoppenbrouwers, JJL et al., "100-Hz Video Upconversion in Plasma Displays", 2002 SID International Symposium Digest of Technical Papers, Boston, MA, May 21-23, 2002, vol. 33/2, May 2002, pp. 922-925.

\* cited by examiner

FIG. 3

| Combinations | Segment 1 | | | | | | | Segment 2 | | | | | | | Segment 3 | | | | | | | Segment 4 | | | | | | | | |
|---|---|---|---|---|---|---|---|---|---|---|---|---|---|---|---|---|---|---|---|---|---|---|---|---|---|---|---|---|---|---|
| | 14 | 3 | 15 | 2 | 10 | 5 | 15 | 14 | 3 | 14 | 2 | 11 | 6 | 14 | 8 | 4 | 16 | 2 | 16 | 1 | 8 | 8 | 14 | 3 | 15 | 2 | 11 | 5 | 14 | 255 |
| | B,H,I,O,X,AD | C,J,Y | D,K,Z | | F,M,N,AB | G,N,AC | B,H,I,O,X,AD | B,H,I,O,X,AD | C,J,Y | D,K,Z | | F,M,N,AB | G,N,AC | B,H,I,O,X,AD | R,P,W | R,P,W | | | | | | R,P,W | B,H,I,O,X,AD | C,J,Y | D,K,Z | | F,M,N,AB | G,N,AC | B,H,I,O,X,AD | |
| 1 | | | | | | | | | | | | | | | | | | | 1 | | | | | | | | | | | 1 |
| 2 | | | | | | | | | | | | | | | | | | 2 | | | | | | | | | | | | 2 | 1.0 |
| 3 | | | | | | | | | | | | | | | | | | 2 | | 1 | | | | | | | | | | 3 | 1 |
| 4 | | | | | | | | | | | | | | | 4 | | | | | | | | | | | | | | | 4 | 1 |
| 5 | | | | | | | | | | | | | | | 4 | | | | | 1 | | | | | | | | | | 5 | 1 |
| 6 | | | | | | | | | | | | | | | 4 | | | 2 | | | | | | | | | | | | 6 | 1 |
| 7 | | | | | | | | | | | | | | | 4 | | | 2 | | 1 | | | | | | | | | | 7 | 1 |
| 8 | | | | | | | | | | | | | | | | | | | | | 8 | | | | | | | | | 8 | 1 |
| 9 | | | | | | | | | | | | | | | | | | | | 1 | 8 | | | | | | | | | 9 | 1 |
| 10 | | | | | | | | | | | | | | | | | | 2 | | | 8 | | | | | | | | | 10 | 1 |
| 11 | | | | | | | | | | | | | | | | | | 2 | | 1 | 8 | | | | | | | | | 11 | 1 |
| 12 | | | | | | | | | | | | | | | 4 | | | | | | 8 | | | | | | | | | 12 | 1 |
| 13 | | | | | | | | | | | | | | | 4 | | | | | 1 | 8 | | | | | | | | | 13 | 1 |
| 14 | | | | | | | | | | | | | | | 4 | | | 2 | | | 8 | | | | | | | | | 14 | 1 |
| 15 | | | | | | | | | | | | | | | 4 | | | 2 | | 1 | 8 | | | | | | | | | 15 | 1 |
| 16 | | | | | | | | | | | | | | | | | 16 | | | | | | | | | | | | | 16 | 1 |
| 17 | | | | | | | | | | | | | | | | | 16 | | | 1 | | | | | | | | | | 17 | 1 |
| 18 | | | | | | | | | | | | | | | | | 16 | 2 | | | | | | | | | | | | 18 | 1 |
| 19 | | | | | | | | | | | | | | | | | 16 | 2 | | 1 | | | | | | | | | | 19 | 1 |
| 20 | | | | | | | | | | | | | | | 4 | | 16 | | | | | | | | | | | | | 20 | 1 |
| 21 | | | | | | | | | | | | | | | 4 | | 16 | | | 1 | | | | | | | | | | 21 | 1 |
| 22 | | | | | | | | | | | | | | | 4 | | 16 | 2 | | | | | | | | | | | | 22 | 1 |
| 23 | | | | | | | | | | | | | | | 4 | | 16 | 2 | | 1 | | | | | | | | | | 23 | 1 |
| 24 | | | | | | | | | | | | | | | | | 16 | | | | 8 | | | | | | | | | 24 | 1 |
| 25 | | | | | | | | | | | | | | | | | 16 | | | 1 | 8 | | | | | | | | | 25 | 1 |
| 26 | | | | | | | | | | | | | | | | | 16 | 2 | | | 8 | | | | | | | | | 26 | 1 |
| 27 | | | | | | | | | | | | | | | | | 16 | 2 | | 1 | 8 | | | | | | | | | 27 | 1 |
| 28 | | | | | | | | | | | | | | | 4 | | 16 | | | | 8 | | | | | | | | | 28 | 1 |
| 29 | | | | | | | | | | | | | | | 4 | | 16 | | | 1 | 8 | | | | | | | | | 29 | 1 |
| 30 | | | | | | | | | | | | | | | 4 | | 16 | 2 | | | 8 | | | | | | | | | 30 | 1 |
| 31 | | | | | | | | | | | | | | | 4 | | 16 | | | 1 | 8 | | | | | | | | | 31 | 1 |
| 32 | | | | | | | | | | | | | | | 8 | 16 | | | | | 8 | | | | | | | | | 32 | 1 |
| 33 | | | | | | | | | | | | | | | 8 | 16 | | | | 1 | 8 | | | | | | | | | 33 | 1 |
| 34 | | | | | | | | | | | | | | | 8 | 16 | 2 | | | | 8 | | | | | | | | | 34 | 1 |
| 35 | | | | | | | | | | | | | | | 8 | 16 | 2 | | | 1 | 8 | | | | | | | | | 35 | 1 |
| 36 | | | | | | | | | | | | | | | 8 | 4 | 16 | | | | 8 | | | | | | | | | 36 | 1 |

| | | | | | | | | | | | | | | | | | | | | | | | | | | | |
|---|---|---|---|---|---|---|---|---|---|---|---|---|---|---|---|---|---|---|---|---|---|---|---|---|---|---|---|
| 80 | 0 | 0 | 0 | | 0 | 5 | 0 | | | 2 | 6 | | 8 | 4 | 16 | 2 | 16 | | 8 | 8 | 0 | 0 | 0 | | 0 | 5 | 0 | 80 | 1 |
| 81 | 0 | 0 | 0 | | 0 | 5 | 0 | | | 2 | 6 | | 8 | 4 | 16 | 2 | 16 | 1 | 8 | 8 | 0 | 0 | 0 | | 0 | 5 | 0 | 81 | 1 |
| 82 | 0 | 0 | 0 | | 0 | 5 | 0 | | | 2 | 6 | | 8 | 4 | 16 | 2 | 16 | | 8 | 8 | 0 | 0 | 0 | 2 | 0 | 5 | 0 | 82 | 1 |
| 83 | 0 | 0 | 0 | | 0 | 5 | 0 | | | 2 | 6 | | 8 | 4 | 16 | 2 | 16 | 1 | 8 | 8 | 0 | 0 | 0 | 2 | 0 | 5 | 0 | 83 | 1 |
| 84 | 0 | 0 | 0 | 2 | 0 | 5 | 0 | | | 2 | 6 | | 8 | 4 | 16 | 2 | 16 | | 8 | 8 | 0 | 0 | 0 | 2 | 0 | 5 | 0 | 84 | 1 |
| 85 | 0 | 0 | 0 | 2 | 0 | 5 | 0 | | | 2 | 6 | | 8 | 4 | 16 | 2 | 16 | 1 | 8 | 8 | 0 | 0 | 0 | 2 | 0 | 5 | 0 | 85 | 1 |
| 86 | 0 | 3 | 0 | | 0 | 5 | 0 | 3 | | | 6 | | 8 | 4 | 16 | 2 | 16 | 1 | 8 | 8 | 0 | 3 | 0 | | 0 | 5 | 0 | 86 | 1 |
| 87 | 0 | 3 | 0 | | 0 | 5 | 0 | 3 | | | 6 | | 8 | 4 | 16 | | 16 | | 8 | 8 | 0 | 3 | 0 | | 0 | 5 | 0 | 87 | 1 |
| 88 | 0 | 3 | 0 | | 0 | 5 | 0 | 3 | | | 6 | | 8 | 4 | 16 | 2 | 16 | 1 | 8 | 8 | 0 | 3 | 0 | | 0 | 5 | 0 | 88 | 1 |
| 89 | 0 | 3 | 0 | | 0 | 5 | 0 | 3 | 2 | | 6 | | 8 | 4 | 16 | 2 | 16 | | 8 | 8 | 0 | 3 | 0 | | 0 | 5 | 0 | 89 | 1 |
| 90 | 0 | 3 | 0 | | 0 | 5 | 0 | 3 | 2 | | 6 | | 8 | 4 | 16 | 2 | 16 | 1 | 8 | 8 | 0 | 3 | 0 | | 0 | 5 | 0 | 90 | 1 |
| 91 | 0 | 3 | 0 | | 0 | 5 | 0 | 3 | 2 | | 6 | | 8 | 4 | 16 | 2 | 16 | | 8 | 8 | 0 | 3 | 0 | 2 | 0 | 5 | 0 | 91 | 1 |
| 92 | 0 | 3 | 0 | | 0 | 5 | 0 | 3 | 2 | | 6 | | 8 | 4 | 16 | 2 | 16 | 1 | 8 | 8 | 0 | 3 | 0 | 2 | 0 | 5 | 0 | 92 | 1 |
| 93 | 0 | 3 | 0 | 2 | 0 | 5 | 0 | 3 | 2 | | 6 | | 8 | 4 | 16 | 2 | 16 | | 8 | 8 | 0 | 3 | 0 | 2 | 0 | 5 | 0 | 93 | 1 |
| 94 | 0 | 3 | 0 | 2 | 0 | 5 | 0 | 3 | 2 | | 6 | | 8 | 4 | 16 | 2 | 16 | 1 | 8 | 8 | 0 | 3 | 0 | 2 | 0 | 5 | 0 | 94 | 1 |
| 95 | 0 | 0 | 0 | | 10 | 0 | 0 | | | 11 | | | 8 | 4 | 16 | 2 | 16 | 1 | 8 | 8 | 0 | 0 | 0 | | 11 | 0 | 0 | 95 | 1 |
| 96 | 0 | 0 | 0 | | 10 | 0 | 0 | | 2 | 11 | | | 8 | 4 | 16 | 2 | 16 | | 8 | 8 | 0 | 0 | 0 | | 11 | 0 | 0 | 96 | 1 |
| 97 | 0 | 0 | 0 | | 10 | 0 | 0 | | 2 | 11 | | | 8 | 4 | 16 | 2 | 16 | 1 | 8 | 8 | 0 | 0 | 0 | | 11 | 0 | 0 | 97 | 1 |
| 98 | 0 | 0 | 0 | | 10 | 0 | 0 | | 2 | 11 | | | 8 | 4 | 16 | 2 | 16 | | 8 | 8 | 0 | 0 | 0 | 2 | 11 | 0 | 0 | 98 | 1 |
| 99 | 0 | 0 | 0 | | 10 | 0 | 0 | | 2 | 11 | | | 8 | 4 | 16 | 2 | 16 | 1 | 8 | 8 | 0 | 0 | 0 | 2 | 11 | 0 | 0 | 99 | 1 |
| 100 | 0 | 0 | 0 | 2 | 10 | 0 | 0 | | 2 | 11 | | | 8 | 4 | 16 | 2 | 16 | | 8 | 8 | 0 | 0 | 0 | 2 | 11 | 0 | 0 | 100 | 1 |
| 101 | 0 | 0 | 0 | 2 | 10 | 0 | 0 | | 2 | 11 | | | 8 | 4 | 16 | 2 | 16 | 1 | 8 | 8 | 0 | 0 | 0 | 2 | 11 | 0 | 0 | 101 | 1 |
| 102 | 0 | 3 | 0 | | 10 | 0 | 0 | 3 | | 11 | | | 8 | 4 | 16 | | 16 | 1 | 8 | 8 | 0 | 3 | 0 | | 11 | 0 | 0 | 102 | 1 |
| 103 | 0 | 3 | 0 | | 10 | 0 | 0 | 3 | | 11 | | | 8 | 4 | 16 | 2 | 16 | | 8 | 8 | 0 | 3 | 0 | | 11 | 0 | 0 | 103 | 1 |
| 104 | 0 | 3 | 0 | | 10 | 0 | 0 | 3 | | 11 | | | 8 | 4 | 16 | 2 | 16 | 1 | 8 | 8 | 0 | 3 | 0 | | 11 | 0 | 0 | 104 | 1 |
| 105 | 0 | 3 | 0 | | 10 | 0 | 0 | 3 | 2 | 11 | | | 8 | 4 | 16 | 2 | 16 | | 8 | 8 | 0 | 3 | 0 | | 11 | 0 | 0 | 105 | 1 |
| 106 | 0 | 3 | 0 | | 10 | 0 | 0 | 3 | 2 | 11 | | | 8 | 4 | 16 | 2 | 16 | 1 | 8 | 8 | 0 | 3 | 0 | | 11 | 0 | 0 | 106 | 1 |
| 107 | 0 | 3 | 0 | | 10 | 0 | 0 | 3 | 2 | 11 | | | 8 | 4 | 16 | 2 | 16 | | 8 | 8 | 0 | 3 | 0 | 2 | 11 | 0 | 0 | 107 | 1 |
| 108 | 0 | 3 | 0 | | 10 | 0 | 0 | 3 | 2 | 11 | | | 8 | 4 | 16 | 2 | 16 | 1 | 8 | 8 | 0 | 3 | 0 | 2 | 11 | 0 | 0 | 108 | 1 |
| 109 | 0 | 3 | 0 | 2 | 10 | 0 | 0 | 3 | 2 | 11 | | | 8 | 4 | 16 | 2 | 16 | | 8 | 8 | 0 | 3 | 0 | 2 | 11 | 0 | 0 | 109 | 1 |
| 110 | 0 | 3 | 0 | 2 | 10 | 0 | 0 | 3 | 2 | 11 | | | 8 | 4 | 16 | 2 | 16 | 1 | 8 | 8 | 0 | 3 | 0 | 2 | 11 | 0 | 0 | 110 | 1 |
| 111 | 0 | 00 | 0 | | 10 | 5 | 0 | | | 11 | 6 | | 8 | 4 | 16 | 2 | 16 | 1 | 8 | 8 | 0 | 0 | 0 | | 11 | 5 | 0 | 111 | 1 |
| 112 | 0 | 0 | 0 | | 10 | 5 | 0 | | 2 | 11 | 6 | | 8 | 4 | 16 | 2 | 16 | | 8 | 8 | 0 | 0 | 0 | | 11 | 5 | 0 | 112 | 1 |
| 113 | 0 | 0 | 0 | | 10 | 5 | 0 | | 2 | 11 | 6 | | 8 | 4 | 16 | 2 | 16 | 1 | 8 | 8 | 0 | 0 | 0 | | 11 | 5 | 0 | 113 | 1 |
| 114 | 0 | 0 | 0 | | 10 | 5 | 0 | | 2 | 11 | 6 | | 8 | 4 | 16 | 2 | 16 | | 8 | 8 | 0 | 0 | 0 | 2 | 11 | 5 | 0 | 114 | 1 |
| 115 | 0 | 0 | 0 | | 10 | 5 | 0 | | 2 | 11 | 6 | | 8 | 4 | 16 | 2 | 16 | 1 | 8 | 8 | 0 | 0 | 0 | 2 | 11 | 5 | 0 | 115 | 1 |
| 116 | 0 | 0 | 0 | 2 | 10 | 5 | 0 | | 2 | 11 | 6 | | 8 | 4 | 16 | 2 | 16 | | 8 | 8 | 0 | 0 | 0 | 2 | 11 | 5 | 0 | 116 | 1 |
| 117 | 0 | 0 | 0 | 2 | 10 | 5 | 0 | | 2 | 11 | 6 | | 8 | 4 | 16 | 2 | 16 | 1 | 8 | 8 | 0 | 0 | 0 | 2 | 11 | 5 | 0 | 117 | 1 |
| 118 | 0 | 3 | 0 | | 10 | 5 | 0 | 3 | | 11 | 6 | | 8 | 4 | 16 | | 16 | 1 | 8 | 8 | 0 | 3 | 0 | | 11 | 5 | 0 | 118 | 1 |
| 119 | 0 | 3 | 0 | | 10 | 5 | 0 | 3 | | 11 | 6 | | 8 | 4 | 16 | 2 | 16 | | 8 | 8 | 0 | 3 | 0 | | 11 | 5 | 0 | 119 | 1 |
| 120 | 0 | 3 | 0 | | 10 | 5 | 0 | 3 | | 11 | 6 | | 8 | 4 | 16 | 2 | 16 | 1 | 8 | 8 | 0 | 3 | 0 | | 11 | 5 | 0 | 120 | 1 |
| 121 | 0 | 3 | 0 | | 10 | 5 | 0 | 3 | 2 | 11 | 6 | | 8 | 4 | 16 | 2 | 16 | | 8 | 8 | 0 | 3 | 0 | | 11 | 5 | 0 | 121 | 1 |
| 122 | 0 | 3 | 0 | | 10 | 5 | 0 | 3 | 2 | 11 | 6 | | 8 | 4 | 16 | 2 | 16 | 1 | 8 | 8 | 0 | 3 | 0 | | 11 | 5 | 0 | 122 | 1 |

FIG. 6

| 123 | 0 | 3 | 0 |   | 10 | 5 | 0 |   | 3 |    | 2 | 11 | 6 |   | 8 | 4 | 16 | 2 | 16 |   | 8 | 8 | 0 | 3 | 0 |   | 2 | 11 | 5 | 0 | 123 | 1 |
|---|---|---|---|---|---|---|---|---|---|---|---|---|---|---|---|---|---|---|---|---|---|---|---|---|---|---|---|---|---|---|---|---|
| 124 | 0 | 3 | 0 |   | 10 | 5 | 0 |   | 3 |    | 2 | 11 | 6 |   | 8 | 4 | 16 | 2 | 16 | 1 | 8 | 8 | 0 | 3 | 0 |   | 2 | 11 | 5 | 0 | 124 | 1 |
| 125 | 0 | 3 | 0 | 2 | 10 | 5 | 0 |   | 3 |    | 2 | 11 | 6 |   | 8 | 4 | 16 | 2 | 16 |   | 8 | 8 | 0 | 3 | 0 |   | 2 | 11 | 5 | 0 | 125 | 1 |
| 126 | 0 | 3 | 0 | 2 | 10 | 5 | 0 |   | 3 |    | 2 | 11 | 6 |   | 8 | 4 | 16 | 2 | 16 | 1 | 8 | 8 | 0 | 3 | 0 |   | 2 | 11 | 5 | 0 | 126 | 1 |
| 127 | 0 | 0 | 15 |   | 0 | 5 | 0 |   |   | 14 | 2 |    | 6 |   | 8 | 4 | 16 | 2 | 16 | 1 | 8 | 8 | 0 | 0 | 15 |   | 2 | 0 | 5 | 0 | 127 | 1 |
| 128 | 0 | 0 | 15 | 2 | 0 | 5 | 0 |   |   | 14 | 2 |    | 6 |   | 8 | 4 | 16 | 2 | 16 |   | 8 | 8 | 0 | 0 | 15 |   | 2 | 0 | 5 | 0 | 128 | 1 |
| 129 | 0 | 3 | 15 | 2 | 0 | 5 | 0 |   |   | 14 | 2 |    | 6 |   | 8 | 4 | 16 | 2 | 16 | 1 | 8 | 8 | 0 | 0 | 15 |   | 2 | 0 | 5 | 0 | 129 | 1 |
| 130 | 0 | 3 | 15 |   | 0 | 5 | 0 |   | 3 | 14 |   |    | 6 |   | 8 | 4 | 16 |   | 16 | 1 | 8 | 8 | 0 | 3 | 15 |   |   | 0 | 5 | 0 | 130 | 1 |
| 131 | 0 | 3 | 15 |   | 0 | 5 | 0 |   | 3 | 14 |   |    | 6 |   | 8 | 4 | 16 | 2 | 16 |   | 8 | 8 | 0 | 3 | 15 |   |   | 0 | 5 | 0 | 131 | 1 |
| 132 | 0 | 3 | 15 |   | 0 | 5 | 0 |   | 3 | 14 |   |    | 6 |   | 8 | 4 | 16 | 2 | 16 | 1 | 8 | 8 | 0 | 3 | 15 |   |   | 0 | 5 | 0 | 132 | 1 |
| 133 | 0 | 3 | 15 |   | 0 | 5 | 0 |   | 3 | 14 | 2 |    | 6 | 0 | 8 | 4 | 16 | 2 | 16 |   | 8 | 8 | 0 | 3 | 15 |   |   | 0 | 5 | 0 | 133 | 1 |
| 134 | 0 | 3 | 15 |   | 0 | 5 | 0 |   | 3 | 14 | 2 |    | 6 | 0 | 8 | 4 | 16 | 2 | 16 | 1 | 8 | 8 | 0 | 3 | 15 |   |   | 0 | 5 | 0 | 134 | 1 |
| 135 | 0 | 3 | 15 |   | 0 | 5 | 0 |   | 3 | 14 | 2 |    | 6 | 0 | 8 | 4 | 16 | 2 | 16 |   | 8 | 8 | 0 | 3 | 15 |   | 2 | 0 | 5 | 0 | 135 | 1 |
| 136 | 0 | 3 | 15 |   | 0 | 5 | 0 |   | 3 | 14 | 2 |    | 6 | 0 | 8 | 4 | 16 | 2 | 16 | 1 | 8 | 8 | 0 | 3 | 15 |   | 2 | 0 | 5 | 0 | 136 | 1 |
| 137 | 0 | 3 | 15 | 2 | 0 | 5 | 0 |   | 3 | 14 | 2 |    | 6 | 0 | 8 | 4 | 16 | 2 | 16 |   | 8 | 8 | 0 | 3 | 15 |   | 2 | 0 | 5 | 0 | 137 | 1 |
| 138 | 0 | 3 | 15 | 2 | 0 | 5 | 0 |   | 3 | 14 | 2 |    | 6 | 0 | 8 | 4 | 16 | 2 | 16 | 1 | 8 | 8 | 0 | 3 | 15 |   | 2 | 0 | 5 | 0 | 138 | 1 |
| 139 | 0 | 0 | 15 |   | 10 | 0 | 0 |   |   | 14 |   | 11 |   | 0 | 8 | 4 | 16 | 2 | 16 | 1 | 8 | 8 | 0 | 0 | 15 |   |   | 11 | 0 | 0 | 139 | 1 |
| 140 | 0 | 0 | 15 |   | 10 | 0 | 0 |   |   | 14 | 2 | 11 |   | 0 | 8 | 4 | 16 | 2 | 16 |   | 8 | 8 | 0 | 0 | 15 |   |   | 11 | 0 | 0 | 140 | 1 |
| 141 | 0 | 0 | 15 |   | 10 | 0 | 0 |   |   | 14 | 2 | 11 |   | 0 | 8 | 4 | 16 | 2 | 16 | 1 | 8 | 8 | 0 | 0 | 15 |   |   | 11 | 0 | 0 | 141 | 1 |
| 142 | 0 | 0 | 15 |   | 10 | 0 | 0 |   |   | 14 | 2 | 11 |   | 0 | 8 | 4 | 16 | 2 | 16 |   | 8 | 8 | 0 | 0 | 15 |   | 2 | 11 | 0 | 0 | 142 | 1 |
| 143 | 0 | 0 | 15 |   | 10 | 0 | 0 |   |   | 14 | 2 | 11 |   | 0 | 8 | 4 | 16 | 2 | 16 | 1 | 8 | 8 | 0 | 0 | 15 |   | 2 | 11 | 0 | 0 | 143 | 1 |
| 144 | 0 | 0 | 15 | 2 | 10 | 0 | 0 |   |   | 14 | 2 | 11 |   | 0 | 8 | 4 | 16 | 2 | 16 |   | 8 | 8 | 0 | 0 | 15 |   | 2 | 11 | 0 | 0 | 144 | 1 |
| 145 | 0 | 0 | 15 | 2 | 10 | 0 | 0 |   |   | 14 | 2 | 11 |   | 0 | 8 | 4 | 16 | 2 | 16 | 1 | 8 | 8 | 0 | 0 | 15 |   | 2 | 11 | 0 | 0 | 145 | 1 |
| 146 | 0 | 3 | 15 |   | 10 | 0 | 0 |   | 3 | 14 |   | 11 |   | 0 | 8 | 4 | 16 |   | 16 | 1 | 8 | 8 | 0 | 0 | 15 |   |   | 11 | 0 | 0 | 146 | 1 |
| 147 | 0 | 3 | 15 |   | 10 | 0 | 0 |   | 3 | 14 |   | 11 |   | 0 | 8 | 4 | 16 | 2 | 16 |   | 8 | 8 | 0 | 3 | 15 |   |   | 11 | 0 | 0 | 147 | 1 |
| 148 | 0 | 3 | 15 |   | 10 | 0 | 0 |   | 3 | 14 |   | 11 |   | 0 | 8 | 4 | 16 | 2 | 16 | 1 | 8 | 8 | 0 | 3 | 15 |   |   | 11 | 0 | 0 | 148 | 1 |
| 149 | 0 | 3 | 15 |   | 10 | 0 | 0 |   | 3 | 14 | 2 | 11 |   | 0 | 8 | 4 | 16 | 2 | 16 |   | 8 | 8 | 0 | 3 | 15 |   |   | 11 | 0 | 0 | 149 | 1 |
| 150 | 0 | 3 | 15 |   | 10 | 0 | 0 |   | 3 | 14 | 2 | 11 |   | 0 | 8 | 4 | 16 | 2 | 16 | 1 | 8 | 8 | 0 | 3 | 15 |   |   | 11 | 0 | 0 | 150 | 1 |
| 151 | 0 | 3 | 15 |   | 10 | 0 | 0 |   | 3 | 14 | 2 | 11 |   | 0 | 8 | 4 | 16 | 2 | 16 |   | 8 | 8 | 0 | 3 | 15 |   | 2 | 11 | 0 | 0 | 151 | 1 |
| 152 | 0 | 3 | 15 |   | 10 | 0 | 0 |   | 3 | 14 | 2 | 11 |   | 0 | 8 | 4 | 16 | 2 | 16 | 1 | 8 | 8 | 0 | 3 | 15 |   | 2 | 11 | 0 | 0 | 152 | 1 |
| 153 | 0 | 3 | 15 | 2 | 10 | 0 | 0 |   | 3 | 14 | 2 | 11 |   | 0 | 8 | 4 | 16 | 2 | 16 |   | 8 | 8 | 0 | 3 | 15 |   | 2 | 11 | 0 | 0 | 153 | 1 |
| 154 | 0 | 3 | 15 | 2 | 10 | 0 | 0 |   | 3 | 14 | 2 | 11 |   | 0 | 8 | 4 | 16 | 2 | 16 | 1 | 8 | 8 | 0 | 3 | 15 |   | 2 | 11 | 0 | 0 | 154 | 1 |
| 155 | 0 | 0 | 15 |   | 10 | 5 | 0 |   |   | 14 |   | 11 | 6 | 0 | 8 | 4 | 16 | 2 | 16 | 1 | 8 | 8 | 0 | 0 | 15 |   |   | 11 | 5 | 0 | 155 | 1 |
| 156 | 0 | 0 | 15 |   | 10 | 5 | 0 |   |   | 14 | 2 | 11 | 6 | 0 | 8 | 4 | 16 | 2 | 16 |   | 8 | 8 | 0 | 0 | 15 |   |   | 11 | 5 | 0 | 156 | 1 |
| 157 | 0 | 0 | 15 |   | 10 | 5 | 0 |   |   | 14 | 2 | 11 | 6 | 0 | 8 | 4 | 16 | 2 | 16 | 1 | 8 | 8 | 0 | 0 | 15 |   |   | 11 | 5 | 0 | 157 | 1 |
| 158 | 0 | 0 | 15 |   | 10 | 5 | 0 |   |   | 14 | 2 | 11 | 6 | 0 | 8 | 4 | 16 | 2 | 16 |   | 8 | 8 | 0 | 0 | 15 |   | 2 | 11 | 5 | 0 | 158 | 1 |
| 159 | 0 | 0 | 15 |   | 10 | 5 | 0 |   |   | 14 | 2 | 11 | 6 | 0 | 8 | 4 | 16 | 2 | 16 | 1 | 8 | 8 | 0 | 0 | 15 |   | 2 | 11 | 5 | 0 | 159 | 1 |
| 160 | 0 | 0 | 15 | 2 | 10 | 5 | 0 |   |   | 14 | 2 | 11 | 6 | 0 | 8 | 4 | 16 | 2 | 16 |   | 8 | 8 | 0 | 0 | 15 |   | 2 | 11 | 5 | 0 | 160 | 1 |
| 161 | 0 | 0 | 15 | 2 | 10 | 5 | 0 |   |   | 14 | 2 | 11 | 6 | 0 | 8 | 4 | 16 | 2 | 16 | 1 | 8 | 8 | 0 | 0 | 15 |   | 2 | 11 | 5 | 0 | 161 | 1 |
| 162 | 0 | 3 | 15 |   | 10 | 5 | 0 |   | 3 | 14 |   | 11 | 6 | 0 | 8 | 4 | 16 |   | 16 | 1 | 8 | 8 | 0 | 3 | 15 |   |   | 11 | 5 | 0 | 162 | 1 |
| 163 | 0 | 3 | 15 |   | 10 | 5 | 0 |   | 3 | 14 |   | 11 | 6 | 0 | 8 | 4 | 16 | 2 | 16 |   | 8 | 8 | 0 | 3 | 15 |   |   | 11 | 5 | 0 | 163 | 1 |
| 164 | 0 | 3 | 15 |   | 10 | 5 | 0 |   | 3 | 14 |   | 11 | 6 | 0 | 8 | 4 | 16 | 2 | 16 | 1 | 8 | 8 | 0 | 3 | 15 |   |   | 11 | 5 | 0 | 164 | 1 |
| 165 | 0 | 3 | 15 |   | 10 | 5 | 0 |   | 3 | 14 | 2 | 11 | 6 | 0 | 8 | 4 | 16 | 2 | 16 |   | 8 | 8 | 0 | 3 | 15 |   |   | 11 | 5 | 0 | 165 | 1 |

FIG. 7

| | | | | | | | | | | | | | | | | | | | | | | | | | | |
|---|---|---|---|---|---|---|---|---|---|---|---|---|---|---|---|---|---|---|---|---|---|---|---|---|---|---|
|166|0|3|15| |10|5|0| |3|14|2|11|6|0|8|4|16|2|16|1|8|8|0|3|15| |11|5|0|166|1|
|167|0|3|15| |10|5|0| |3|14|2|11|6|0|8|4|16|2|16| |8|8|0|3|15|2|11|5|0|167|1|
|168|0|3|15| |10|5|0| |3|14|2|11|6|0|8|4|16|2|16|1|8|8|0|3|15|2|11|5|0|168|1|
|169|0|3|15|2|10|5|0| |3|14|2|11|6|0|8|4|16|2|16| |8|8|0|3|15|2|11|5|0|169|1|
|170|14|0|0|2|0|5|15|14| |2| |6|14|8|4|16|2|16|1|8|8|14|0|0|2|0|5|14|170|1|
|171|14|3|0| |0|5|15|14|3| | |6|14|8|4|16| |16|1|8|8|14|3|0| |0|5|14|171|1|
|172|14|3|0| |0|5|15|14|3| | |6|14|8|4|16|2|16| |8|8|14|3|0| |0|5|14|172|1|
|173|14|3|0| |0|5|15|14|3| | |6|14|8|4|16|2|16|1|8|8|14|3|0| |0|5|14|173|1|
|174|14|3|0| |0|5|15|14|3|2| |6|14|8|4|16|2|16| |8|8|14|3|0| |0|5|14|174|1|
|175|14|3|0| |0|5|15|14|3|2| |6|14|8|4|16|2|16|1|8|8|14|3|0| |0|5|14|175|1|
|176|14|3|0| |0|5|15|14| |2| |6|14|8|4|16|2|16| |8|8|14|3|0|2|0|5|14|176|1|
|177|14|3|0| |0|5|15|14| |2| |6|14|8|4|16|2|16|1|8|8|14|3|0|2|0|5|14|177|1|
|178|14|3|0|2|0|5|15|14| |2| |6|14|8|4|16|2|16| |8|8|14|3|0|2|0|5|14|178|1|
|179|14|3|0|2|0|5|15|14|3|2| |6|14|8|4|16|2|16|1|8|8|14|3|0|2|0|5|14|179|1|
|180|14|0|0| |10|0|15|14| |11| |14|8|4|16|2|16|1|8|8|14|0|0| |11|0|14|180|1|
|181|14|0|0| |10|0|15|14| |2|11| |14|8|4|16|2|16| |8|8|14|0|0| |11|0|14|181|1|
|182|14|0|0| |10|0|15|14| |2|11| |14|8|4|16|2|16|1|8|8|14|0|0| |11|0|14|182|1|
|183|14|0|0| |10|0|15|14| |2|11| |14|8|4|16|2|16| |8|8|14|0|0|2|11|0|14|183|1|
|184|14|0|0| |10|0|15|14| |2|11| |14|8|4|16|2|16|1|8|8|14|0|0|2|11|0|14|184|1|
|185|14|0|0|2|10|0|15|14| |2|11| |14|8|4|16|2|16| |8|8|14|0|0|2|11|0|14|185|1|
|186|14|0|0|2|10|0|15|14| |2|11| |14|8|4|16|2|16|1|8|8|14|0|0|2|11|0|14|186|1|
|187|14|3|0| |10|0|15|14|3| |11| |14|8|4|16| |16|1|8|8|14|3|0| |11|0|14|187|1|
|188|14|3|0| |10|0|15|14|3| |11| |14|8|4|16|2|16| |8|8|14|3|0| |11|0|14|188|1|
|189|14|3|0| |10|0|15|14|3| |11| |14|8|4|16|2|16|1|8|8|14|3|0| |11|0|14|189|1|
|190|14|3|0| |10|0|15|14|3|2|11| |14|8|4|16|2|16| |8|8|14|3|0| |11|0|14|190|1|
|191|14|3|0| |10|0|15|14|3|2|11| |14|8|4|16|2|16|1|8|8|14|3|0| |11|0|14|191|1|
|192|14|3|0| |10|0|15|14|3|2|11| |14|8|4|16|2|16| |8|8|14|3|0|2|11|0|14|192|1|
|193|14|3|0| |10|0|15|14|3|2|11| |14|8|4|16|2|16|1|8|8|14|3|0|2|11|0|14|193|1|
|194|14|3|0|2|10|0|15|14|3|2|11| |14|8|4|16|2|16| |8|8|14|3|0|2|11|0|14|194|1|
|195|14|3|0|2|10|0|15|14|3|2|11| |14|8|4|16|2|16|1|8|8|14|3|0|2|11|0|14|195|1|
|196|14|0|0| |10|5|15|14| |11|6|14|8|4|16|2|16|1|8|8|14|0|0| |11|5|14|196|1|
|197|14|0|0| |10|5|15|14| |2|11|6|14|8|4|16|2|16| |8|8|14|0|0| |11|5|14|197|1|
|198|14|0|0| |10|5|15|14| |2|11|6|14|8|4|16|2|16|1|8|8|14|0|0| |11|5|14|198|1|
|199|14|0|0| |10|5|15|14| |2|11|6|14|8|4|16|2|16| |8|8|14|0|0|2|11|5|14|199|1|
|200|14|0|0| |10|5|15|14| |2|11|6|14|8|4|16|2|16|1|8|8|14|0|0|2|11|5|14|200|1|
|201|14|0|0|2|10|5|15|14| |2|11|6|14|8|4|16|2|16| |8|8|14|0|0|2|11|5|14|201|1|
|202|14|0|0|2|10|5|15|14| |2|11|6|14|8|4|16|2|16|1|8|8|14|0|0|2|11|5|14|202|1|
|203|14|3|0| |10|5|15|14|3| |11|6|14|8|4|16| |16| |8|8|14|3|0| |11|5|14|203|1|
|204|14|3|0| |10|5|15|14|3| |11|6|14|8|4|16|2|16| |8|8|14|3|0| |11|5|14|204|1|
|205|14|3|0| |10|5|15|14|3| |11|6|14|8|4|16|2|16|1|8|8|14|3|0| |11|5|14|205|1|
|206|14|3|0| |10|5|15|14|3|2|11|6|14|8|4|16|2|16| |8|8|14|3|0| |11|5|14|206|1|
|207|14|3|0| |10|5|15|14|3|2|11|6|14|8|4|16|2|16|1|8|8|14|3|0| |11|5|14|207|1|
|208|14|3|0| |10|5|15|14|3|2|11|6|14|8|4|16|2|16| |8|8|14|3|0|2|11|5|14|208|1|

FIG. 8

| | | | | | | | | | | | | | | | | | | | | | | | | | | | |
|---|---|---|---|---|---|---|---|---|---|---|---|---|---|---|---|---|---|---|---|---|---|---|---|---|---|---|---|
|209|14|3|0| |10|5|15|14|3| |2|11|6|14|8|4|16|2|16|1|8|8|14|3|0|2|11|5|14|209|1|
|210|14|3|0|2|10|5|15|14|3| |2|11|6|14|8|4|16|2|16| |8|8|14|3|0|2|11|5|14|210|1|
|211|14|3|0|2|10|5|15|14|3| |2|11|6|14|8|4|16|2|16|1|8|8|14|3|0|2|11|5|14|211|1|
|212|14|0|15| |0|5|15|14| |14|2| |6|14|8|4|16|2|16|1|8|8|14|0|15|2|0|5|14|212|1|
|213|14|0|15|2|0|5|15|14| |14|2| |6|14|8|4|16|2|16| |8|8|14|0|15|2|0|5|14|213|1|
|214|14|0|15|2|0|5|15|14| |14|2| |6|14|8|4|16|2|16|1|8|8|14|0|15|2|0|5|14|214|1|
|215|14|3|15| |0|5|15|14|3|14| | |6|14|8|4|16| |16|1|8|8|14|3|15| |0|5|14|215|1|
|216|14|3|15| |0|5|15|14|3|14| | |6|14|8|4|16|2|16| |8|8|14|3|15| |0|5|14|216|1|
|217|14|3|15| |0|5|15|14|3|14| | |6|14|8|4|16|2|16|1|8|8|14|3|15| |0|5|14|217|1|
|218|14|3|15| |0|5|15|14|3|14|2| |6|14|8|4|16|2|16| |8|8|14|3|15| |0|5|14|218|1|
|219|14|3|15| |0|5|15|14|3|14|2| |6|14|8|4|16|2|16|1|8|8|14|3|15| |0|5|14|219|1|
|220|14|3|15| |0|5|15|14|3|14|2| |6|14|8|4|16|2|16| |8|8|14|3|15|2|0|5|14|220|1|
|221|14|3|15| |0|5|15|14|3|14|2| |6|14|8|4|16|2|16|1|8|8|14|3|15|2|0|5|14|221|1|
|222|14|3|15|2|0|5|15|14|3|14|2| |6|14|8|4|16|2|16| |8|8|14|3|15|2|0|5|14|222|1|
|223|14|3|15|2|0|5|15|14|3|14|2| |6|14|8|4|16|2|16|1|8|8|14|3|15|2|0|5|14|223|1|
|224|14|0|15| |10|0|15|14| |14| |11| |14|8|4|16|2|16|1|8|8|14|0|15| |11|0|14|224|1|
|225|14|0|15| |10|0|15|14| |14|2|11| |14|8|4|16|2|16| |8|8|14|0|15| |11|0|14|225|1|
|226|14|0|15| |10|0|15|14| |14|2|11| |14|8|4|16|2|16|1|8|8|14|0|15| |11|0|14|226|1|
|227|14|0|15| |10|0|15|14| |14|2|11| |14|8|4|16|2|16|1|8|8|14|0|15|2|11|0|14|227|1|
|228|14|0|15| |10|0|15|14| |14|2|11| |14|8|4|16|2|16|1|8|8|14|0|15|2|11|0|14|228|1|
|229|14|0|15|2|10|0|15|14| |14|2|11| |14|8|4|16|2|16| |8|8|14|0|15|2|11|0|14|229|1|
|230|14|0|15|2|10|0|15|14| |14|2|11| |14|8|4|16|2|16|1|8|8|14|0|15|2|11|0|14|230|1|
|231|14|3|15| |10|0|15|14|3|14| |11| |14|8|4|16| |16|1|8|8|14|3|15| |11|0|14|231|1|
|232|14|3|15| |10|0|15|14|3|14| |11| |14|8|4|16|2|16| |8|8|14|3|15| |11|0|14|232|1|
|233|14|3|15| |10|0|15|14|3|14| |11| |14|8|4|16|2|16|1|8|8|14|3|15| |11|0|14|233|1|
|234|14|3|15| |10|0|15|14|3|14|2|11| |14|8|4|16|2|16| |8|8|14|3|15| |11|0|14|234|1|
|235|14|3|15| |10|0|15|14|3|14|2|11| |14|8|4|16|2|16|1|8|8|14|3|15| |11|0|14|235|1|
|236|14|3|15| |10|0|15|14|3|14|2|11| |14|8|4|16|2|16| |8|8|14|3|15|2|11|0|14|236|1|
|237|14|3|15| |10|0|15|14|3|14|2|11| |14|8|4|16|2|16|1|8|8|14|3|15|2|11|0|14|237|1|
|238|14|3|15|2|10|0|15|14|3|14|2|11| |14|8|4|16|2|16| |8|8|14|3|15|2|11|0|14|238|1|
|239|14|3|15|2|10|0|15|14|3|14|2|11|6|14|8|4|16|2|16|1|8|8|14|3|15|2|11|0|14|239|1|
|240|14|0|15| |10|5|15|14| |14| |11|6|14|8|4|16|2|16|1|8|8|14|0|15| |11|5|14|240|1|
|241|14|0|15| |10|5|15|14| |14|2|11|6|14|8|4|16|2|16| |8|8|14|0|15| |11|5|14|241|1|
|242|14|0|15| |10|5|15|14| |14|2|11|6|14|8|4|16|2|16|1|8|8|14|0|15| |11|5|14|242|1|
|243|14|0|15| |10|5|15|14| |14|2|11|6|14|8|4|16|2|16|1|8|8|14|0|15|2|11|5|14|243|1|
|244|14|0|15| |10|5|15|14| |14|2|11|6|14|8|4|16|2|16|1|8|8|14|0|15|2|11|5|14|244|1|
|245|14|0|15|2|10|5|15|14| |14|2|11|6|14|8|4|16|2|16| |8|8|14|0|15|2|11|5|14|245|1|
|246|14|0|15|2|10|5|15|14| |14|2|11|6|14|8|4|16|2|16|1|8|8|14|0|15|2|11|5|14|246|1|
|247|14|3|15| |10|5|15|14|3|14| |11|6|14|8|4|16| |16|1|8|8|14|3|15| |11|5|14|247|1|
|248|14|3|15| |10|5|15|14|3|14| |11|6|14|8|4|16|2|16| |8|8|14|3|15| |11|5|14|248|1|
|249|14|3|15| |10|5|15|14|3|14| |11|6|14|8|4|16|2|16|1|8|8|14|3|15| |11|5|14|249|1|
|250|14|3|15| |10|5|15|14|3|14|2|11|6|14|8|4|16|2|16| |8|8|14|3|15| |11|5|14|250|1|
|251|14|3|15| |10|5|15|14|3|14|2|11|6|14|8|4|16|2|16|1|8|8|14|3|15| |11|5|14|251|1|

FIG. 9

| 252 | 14 | 3 | 15 |   | 10 | 5 | 15 | 14 | 3 | 14 | 2 | 11 | 6 | 14 | 8 | 4 | 16 | 2 | 16 |   | 8 | 8 | 14 | 3 | 15 | 2 | 11 | 5 | 14 | 252 | 1 |
|---|---|---|---|---|---|---|---|---|---|---|---|---|---|---|---|---|---|---|---|---|---|---|---|---|---|---|---|---|---|---|---|
| 253 | 14 | 3 | 15 |   | 10 | 5 | 15 | 14 | 3 | 14 | 2 | 11 | 6 | 14 | 8 | 4 | 16 | 2 | 16 | 1 | 8 | 8 | 14 | 3 | 15 | 2 | 11 | 5 | 14 | 253 | 1 |
| 254 | 14 | 3 | 15 | 2 | 10 | 5 | 15 | 14 | 3 | 14 | 2 | 11 | 6 | 14 | 8 | 4 | 16 | 2 | 16 |   | 8 | 8 | 14 | 3 | 15 | 2 | 11 | 5 | 14 | 254 | 1 |
| 255 | 14 | 3 | 15 | 2 | 10 | 5 | 15 | 14 | 3 | 14 | 2 | 11 | 6 | 14 | 8 | 4 | 16 | 2 | 16 | 1 | 8 | 8 | 14 | 3 | 15 | 2 | 11 | 5 | 14 | 255 | 1 |

SEQUENTIAL MULTI-SEGMENT PULSE WIDTH MODULATED DISPLAY SYSTEM

CROSS REFERENCE TO RELATED APPLICATION

This application claims the benefit, under 35 U.S.C. § 365 of International Application PCT/US03/20993, filed Jul. 7, 2003, which was published in accordance with PCT Article 21(2) on Aug. 12, 2004 in English and which claims the benefit of U.S. provisional patent application No. 60/440,733, filed Jan. 17, 2003.

TECHNICAL FIELD

This invention relates to technique for operating a sequential pulse width modulated display system to reduce the incidence of motion artifacts.

BACKGROUND ART

There presently exist television projection systems that utilize a type of semiconductor device known as a Digital Micromirror Device (DMD). A typical DMD comprises a plurality of individually movable micromirrors arranged in a rectangular array. Each micromirror pivots about limited arc, typically on the order of 10°-12° under the control of a corresponding driver cell that latches a bit therein. Upon the application of a previously latched "1" bit, the driver cell causes its associated micromirror cell to pivot to a first position. Conversely, the application of a previously latched "0" bit to the driver cell causes the driver cell to pivot its associated micromirror to a second position. By appropriately positioning the DMD between a light source and a projection lens, each individual micromirror of the DMD device, when pivoted by its corresponding driver cell to the first position, will reflect light from the light source through the lens and onto a display screen to illuminate an individual picture element (pixel) in the display. When pivoted to its second position, each micromirror reflects light away from the display screen, causing the corresponding pixel to appear dark. An example of such DMD device is the DMD of the DLP™ projection system available from Texas Instruments, Dallas Tex.

Present day television projection systems that incorporate a DMD of the type described control the brightness (illumination) of the individual pixels by controlling the duty cycle during which the individual micromirrors remain "on" (i.e., pivoted to their first position), versus the interval during which the micromirrors remain "off" (i.e. pivoted to their second position). To that end, such present day DMD-type projection systems use pulse width modulation to control the pixel brightness by varying the duty cycle of each micromirror in accordance with the state of the pulses in a sequence of pulse width segments. Each pulse width segment comprises a string of pulses of different time duration. The actuation state of each pulse in a pulse width segment (i.e., whether each pulse is turned on or off) determines whether the micromirror remains on or off for the duration of that pulse. In other words, the larger the sum of the widths of the pulses in a pulse width segment that are turned on (actuated), the longer the duty cycle of each micromirror.

In a television projection system utilizing a DMD, the frame interval, i.e., the time between displaying successive images, depends on the selected television standard. The NTSC standard currently in use in the United States requires a frame interval of 1/60 second whereas certain European television standards employ a frame interval of 1/50 second.

Present day DMD-type television projection systems typically provide a color display by projecting red, green, and blue images either simultaneously or in sequence during each frame interval. A typical sequential DMD-type projection system utilizes a motor-driven color wheel interposed in the light path of the DMD. The color wheel has a plurality of separate primary color windows, typically red, green and blue, so that during successive intervals, red, green, and blue light, respectively, falls on the DMD.

To achieve a color picture, red, green and blue light must fall on the DMD at least once within each successive frame interval. If only one red, one green and one blue image is made and each consumes 1/3 of the frame interval, then the large time interval between colors will produce perceptible color breakup with motion. Present day DMD systems address this problem by breaking each color into several intervals and interleaving the intervals in time, thereby reducing the delay between colors. Each color interval corresponds to a pulse width segment, with the pulse width segment for each color interleaved with the segments of the other colors.

In addition to color break up with motion, another type of motion artifact can appear in a DMD-type television projection pulse width modulated display system. The particular color that appears in the first segment can adversely affect the appearance of moving white object. For example, making the first segment green will produce a green leading edge for the white moving object. For similar reasons, making the last segment green is also undesirable. Ideally, the color green should appear (in terms of brightness) during the middle of the interval of the sequence of pulse width segments.

Thus there is a need for a technique for operating a pulse width modulated sequential display that reduces motion artifacts.

BRIEF SUMMARY OF THE INVENTION

Briefly, in accordance with the present principles, there is provided a technique for operating a pulse width modulated display system having a plurality of pixels each of whose illumination is controlled responsive to pulses within a sequence of pulse width segments. The state of each individual pulse in a pulse width segment determines whether the corresponding pixel remains illuminated during the interval associated with that pulse. To increase pixel brightness within a range lying between first and second pixel brightness boundaries, at least one pulse in a first pulse width segment is actuated (turned-on). To increase pixel brightness above the second pixel brightness boundary, at least one pulse within one or more additional pulse width segments is actuated such that the pulses within the additional segments are actuated unequally so that the total sum (duration) of actuated pulses in additional pulse width segments differs. In other words, the additional segments are lit unequally. The additional pulse width segments that are closest in time to the first pulse width segment will have greater total duration of actuated pulses for a given pixel brightness compared to the additional pulse width segments farther in time from the first pulse width segment. Actuating the pulses in this manner serves to: (a) limit the time dispersal of darker objects within a picture, (b) minimize the light redistribution between time segments for incremental brightness changes, and (c) taper the light intensity of the sequence of pulse width segments for a given picture to minimize motion artifacts. In particular, the light intensity tapers up until reaching the middle of the picture interval and thereafter tapers down until the end of the picture interval.

BRIEF DESCRIPTION OF THE DRAWINGS

FIGS. 3-9 collectively illustrate a pulse map depicting each of a plurality of sequences of pulse width segments that control the brightness of a corresponding color of one of the pixels within the display system of FIG. 1 to reduce motion artifacts in accordance with the present principles.

DETAILED DESCRIPTION

Figures 1, 2:
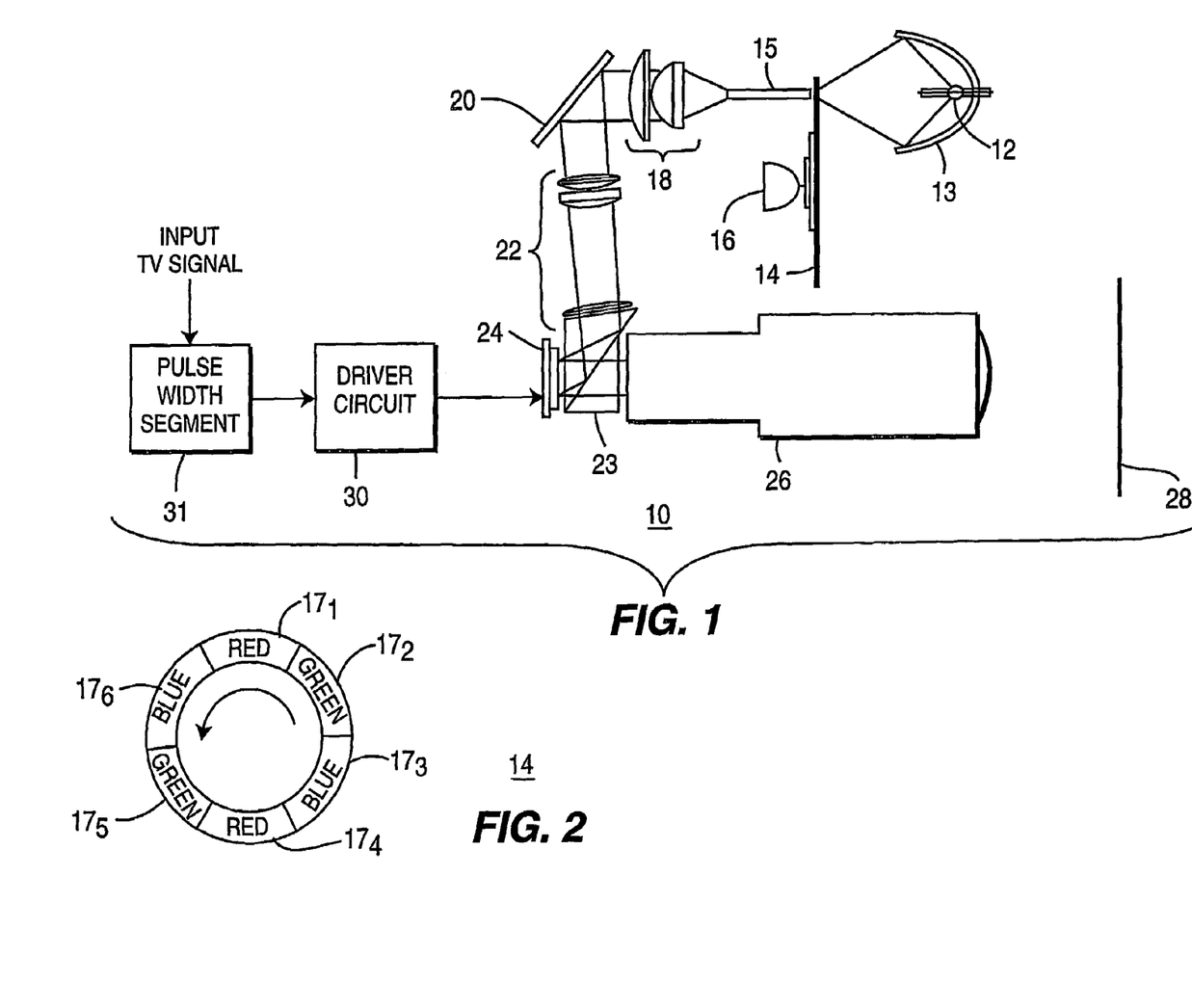
FIG. 1 depicts a block schematic diagram of a present-day pulse width modulated display system.
FIG. 2 depicts a frontal view of a color wheel comprising part of the display system of FIG. 1.

FIG. 1 depicts a present-day pulse width modulated sequential display system 10 of the type disclosed in the Application Report "Single Panel DLP™ Projection System Optics" published by Texas Instruments, June 2001. The system 10 comprises a lamp 12 situated at the focus of a parabolic reflector 13 that reflects light from the lamp through a color wheel 14 and into an integrator rod 15. A motor 16 rotates the color wheel 14 to place a separate one of red, green and blue primary color windows between the lamp 12 and the integrator rod 15. In an exemplary embodiment depicted in FIG. 2, the color wheel 14 has diametrically opposed red, green and blue color windows $17_1$ and $17_4$, $17_2$ and $17_5$, and $17_3$ and $17_6$, respectively. Thus, as the motor 16 rotates the color wheel 14 of FIG. 2 in a counter-clockwise direction, red, green and blue light will strike the integrator rod 15 of FIG. 1. In practice, the motor 16 rotates the color wheel 14 at a sufficiently high speed so that during a frame interval of a 1/60 second, red, green and blue light each strikes the integrator rod four times, yielding 12 color images within the frame interval, four red, four green and four blue that are interleaved.

Referring to FIG. 1, the integrator rod 15 concentrates the light from the lamp 12, as it passes through a successive one of the red, green and blue color windows of the color wheel 14, onto a set of relay optics 18. The relay optics 18 spread the light into a plurality of parallel beams that strike a fold mirror 20, which reflects the beams through a set of lenses 22 and onto a Total Internal Reflectance (TIR) prism 23. The TIR prism 23 reflects the parallel light beams onto a Digital Mirror Device (DMD) 24, such as the DMD device manufactured by Texas Instruments, for selective reflection into a projection lens 26 and onto a screen 28.

The DMD 24 takes the form of a semiconductor device having a plurality of individual micromirrors (not shown) arranged in an array. By way of example, the DMD manufactured and sold by Texas Instruments has a micromirror array of 1280 columns by 720 rows, yielding 921,600 pixels in the resultant picture projected onto the screen 28. Other DMDs can have a different arrangement of micromirrors. As discussed previously, each micromirror in the DMD pivots about a limited arc under the control of a corresponding driver cell (not shown) in response to the state of a binary bit previously latched in the driver cell. Each micromirror rotates to one of a first and a second position depending on whether the latched bit applied to the driver cell, is a "1" or a "0", respectively. When pivoted to its first position, each micromirror reflects light into the lens 26 and onto the screen 28 to illuminate a corresponding pixel. While each micromirror remains pivoted to its second position, the corresponding pixel appears dark. The total duration in which each micromirror reflects light through the projection lens 26 and onto the screen 28 (the micromirror duty cycle) determines the pixel brightness.

The individual driver cells in the DMD 24 receive drive signals from a driver circuit 30 of a type well known in the art and exemplified by the circuitry described in the paper "High Definition Display System Based on Micromirror Device", R. J. Grove et al. *International Workshop on HDTV* (October 1994). The driver circuit 30 generates the drive signals for the driver cells in the DMD 24 in accordance with sequences of pulse width segments applied to the driver circuit by a processor 31. Each pulse width segment comprises a string of pulses of different time duration, the state of each pulse determining whether the micromirror remains on or off for the duration of that pulse. The shortest possible pulse (i.e., a 1-pulse) that can occur within a pulse width segment (some times referred to as a Least Significant Bit or LSB) typically has a 15-microsecond duration, whereas the larger pulses in the segment each have a duration that is larger than one LSB. In practice, each pulse within a pulse width segment corresponds to a bit (hereinafter described as a "pixel control" bit) within a digital bit stream whose state determines whether the corresponding pulse is turned on or off. A "1" bit represents a pulse that is turned on, whereas a "0" bit represents a pulse that is turned off. The total sum (duration) of the actuated pulses in a pulse width segment controls the brightness of a corresponding pixel. Thus, the greater the combined pulse width (as measured in LSBs) of the actuated pulses in a pulse width segment, the greater the pixel brightness.

The driver circuit 31 generates each of four separate pulse width segments per color for every pixel. Thus, during each frame interval, the driver circuit 31 generates pixel control bits for the pulses of twelve segments, four red, four blue and four green. The transmission of the pixel control bits to the DMD 24 is synchronized with the rotation of the color wheel so that each segment for a given color corresponds to the appearance of that color for illumination on the DMD 24.

With certain types of pulse width modulated sequential display systems, constraints can exist in terms of the permissible patterns of pulse width segments that can be applied to the DMD. Some pulse width modulated sequential display system also impose certain operating characteristics that are less than desirable, such as illuminating a green segment first, rather than red or blue. Unfortunately, for a moving object, it is undesirable to make a green segment first in brightness because that will result in having the leading edge of a moving white object appear green. It is better to have the leading edge appear blue or red.

In accordance with present principles, motion artifacts can be reduced by having the sixth segment in time (a blue segment) become first in brightness at low pixel brightness levels as compared to the first segment in time (a green segment) which remains unlit at such brightness levels under circumstances when the first segment in time is green, followed by red, and then blue. Actuating the pulses within the sixth segment at low brightness levels while not actuating the pulses in the first segment will cause the sixth segment to appear much brighter. Thus, the sixth segment appears brighter first even though the pulses in that segment lag those of the first segment in time. Similarly, the seventh segment (green) and the eighth segment (red) likewise become brighter before other segments of the same color. Thus, at lower pixel brightness levels, the segment first in brightness is a blue segment, not a green segment. Also the last appearing segment at low pixel brightness values becomes a red segment. Hence the green segment, although first in time, really appears in the middle of the frame interval at lower pixel brightness values.

To better understand the manner in which the pulses within each segment become actuated at particular brightness levels, refer to FIGS. 3-9 which collectively depict the actuation state of the pulses within each the four pulse width segments, respectively, labeled as Segments 1-4, respectively, for a given color at each of pixel brightness levels 1-255. The particular operating characteristics of the pulse width modulated sequential display system 10 can sometimes force each of the Segments 1-4 to have different arrangements of pulses. In the illustrated embodiment, a comparison of the pattern of pulses of each of Segments 1-4 reveals that each has a different pattern although this need not be the case.

Figure 3:
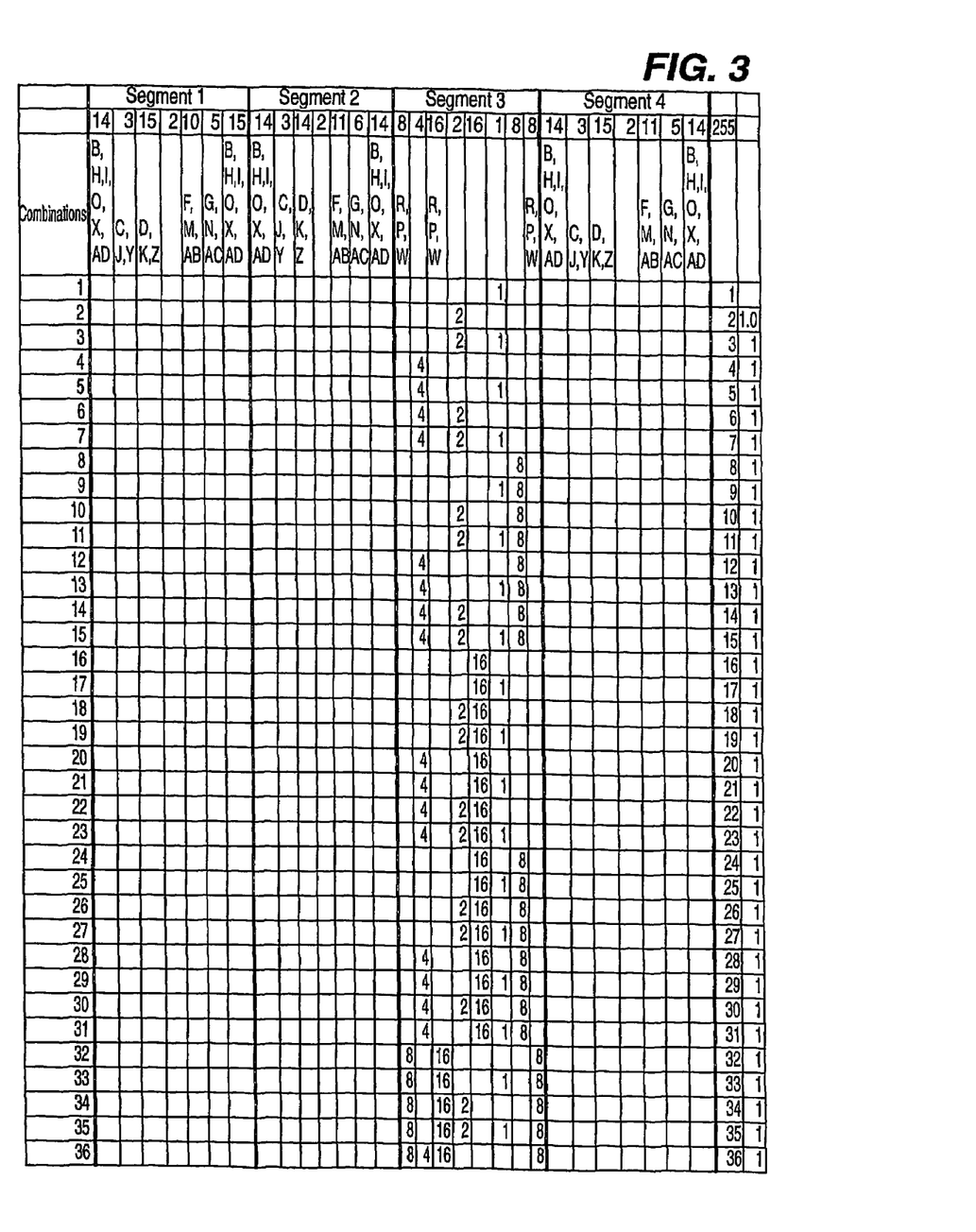
Figure 4:
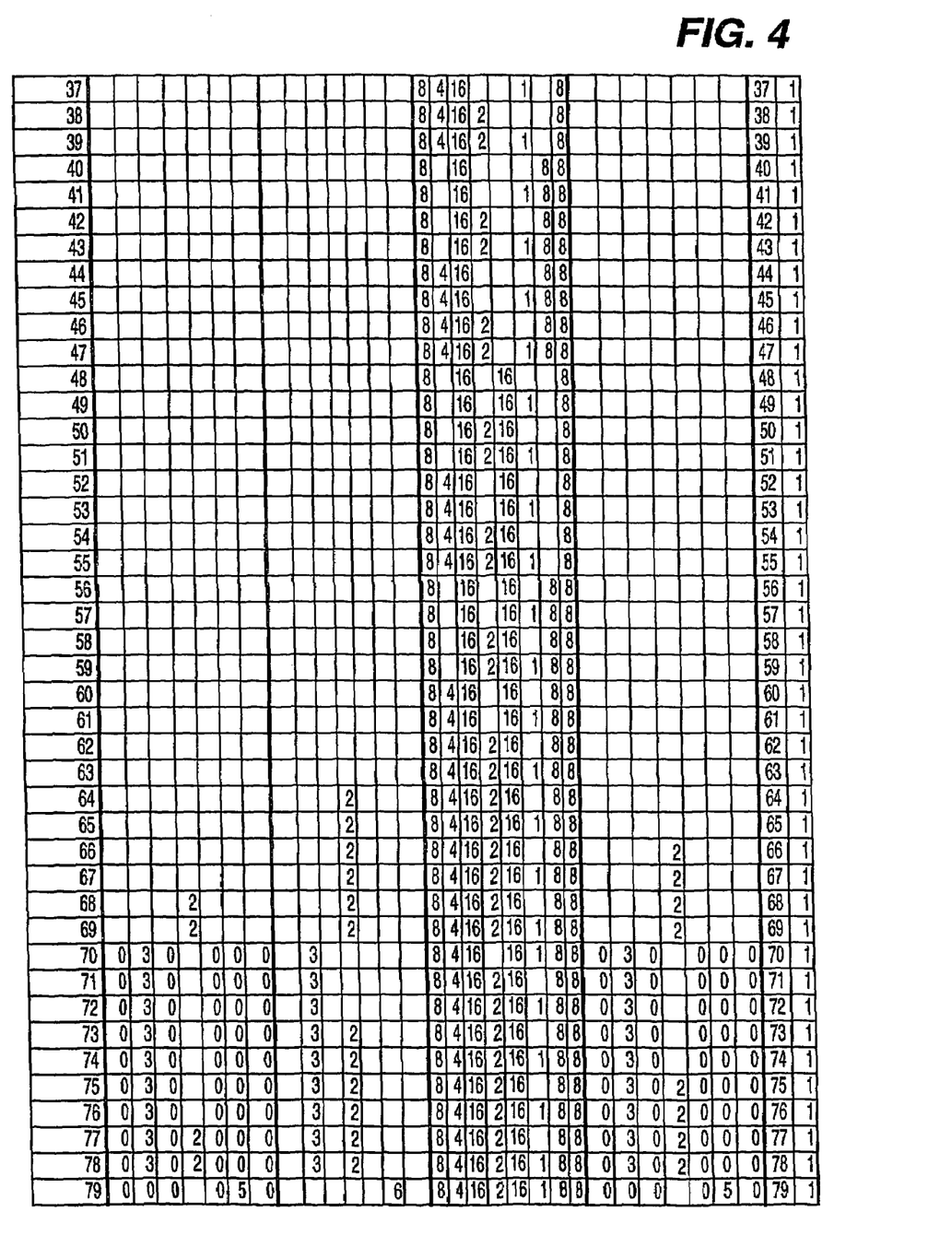
Figure 9:
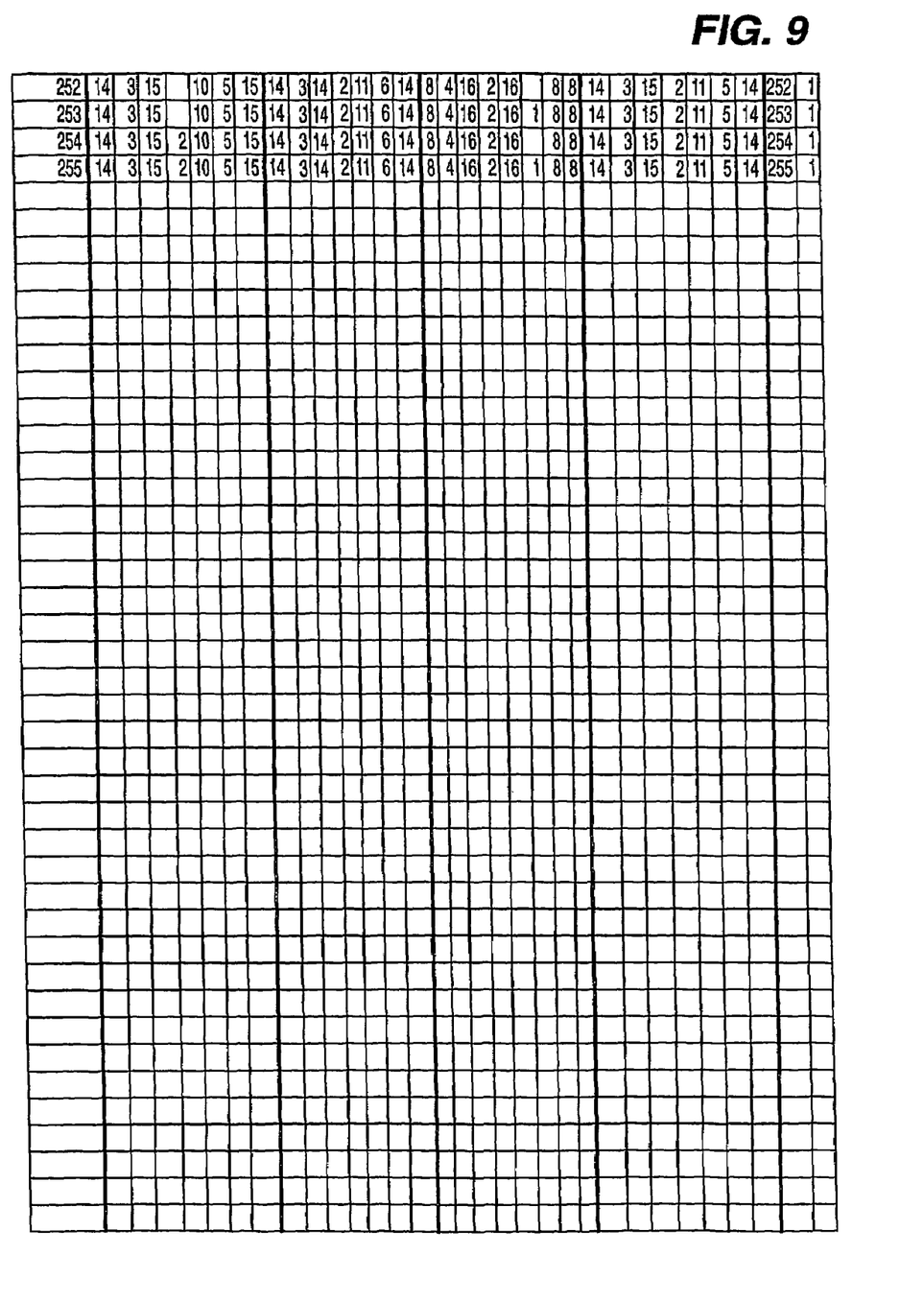

As seen in FIGS. 3 and 4 which collectively depict the pulse actuation state for Segments 1-4 for brightness levels 1-79, for the darkest 63 states, that is, between pixel brightness levels 1-63 (generally corresponding to 0 to 50 IRE units), only the pulses within Segment 3 are actuated. In other words, the light remains confined to Segment 3, so that for an increase in brightness between a first and second pixel brightness boundaries (corresponding brightness levels 1 and 63, respectively,) no inter-segment redistribution of light occurs. Maintaining the distribution of light within a single segment until reaching a prescribed pixel brightness boundary is beneficial because doing so prevents a large time shift of the light, thereby avoiding visible dynamic contouring. Furthermore, each of the moving objects in this brightness range is displayed with only a single red, green and blue trio of adjacent segments. This avoids the appearance of multiple objects when moving, a major artifact of some sequential pulse width modulated displays that is to be avoided.

Referring to FIG. 4, and to FIGS. 5-8, to achieve higher brightness levels above brightness level 63, the pulses in additional pulse width segments (i.e., Segments 1, 2, and 4) must become actuated to light more segments. Since there are no 1-LSB pulses in Segments 1, 2, and 4, increasing pixel brightness in a one 1 LSB step will cause some redistribution of light between segments. In other words, one or more pulses in one or more segments other than Segment 3 must become actuated (turned on) while one or more pulses in the other segments must be de-actuated (turned off). An example of such a re-distribution occurs at the transition between pixel brightness levels 63 and 64. A 2-LSB pulse in Segment 2 is actuated and a 1-LSB pulse in Segment 3 is de-actuated. In this case, there is a 1-LSB redistribution between segments, which is tolerable at this brightness level because it is less than 2% of the brightness level.

As the other segments become lit for higher brightness (i.e., the pulses within the other segments become actuated), a multiple moving object artifact starts to become visible. In pulse width modulated sequential display system, this type of artifact seems unavoidable. However, in an attempt to ameliorate this effect and to reduce the appearance of a colored edge on a moving object, as Segments 1, 2 and 4 become lit to increase the pixel brightness, these segments are not lit up equally. In accordance with present principles, one or more pulses within Segment 2 (which is closest in time to Segment 3) are actuated next in brightness to light up Segment 2 brighter than the other segments. In other words, Segment 2 will have a greater total duration of actuated pulses as compared to total duration of the actuated pulses in Segments 1 and 4. Conversely, Segment 1 is lit up weaker, that is, this segment has a smaller total duration of actuated pulses. As a result of having a greater total duration of actuated pulses within Segment 2 which is closer in time to Segment 3, and by having a smaller total duration of actuated pulses in Segment 1 which is further in time, a taper is created in the light distribution across the segments. At a given pixel brightness level, the total duration of actuated pulses within each of the segments tends to taper up towards the middle pulse width segment (corresponding to the middle of the frame interval) and then tends to taper down away from the middle pulse width segment (corresponding to the end of the frame interval. This "taper" tends to reduce visibility of the colored edge on a moving white object and reduce the objectionable character of the multiple moving object effect. In achieving the above described taper, care should be taken to assure that the redistribution of light, when incrementing brightness in 1 LSB steps, continues to be minimized for each individual step as the pixel brightness increases. An examination of the pulse patterns of FIGS. 3-9 reveals that such is the case.

The foregoing describes a technique for operating a sequential pulse width modulated display system that reduces motion artifacts by limiting the time dispersal of darker objects, minimizing the distribution among pulse width segments and tapering up and down the light *intensity of segments.

The invention claimed is:

1. A method of operating a pulse width modulated display system having a plurality of pixels each of whose illumination is controlled responsive to pulses within a sequence of pulse width segments, with the state of each individual pulse in a segment determining whether the corresponding pixel remains illuminated during the interval associated with that pulse, comprising the steps of:

actuating at least one pulse in a first in brightness pulse width segment to alter the pixel brightness within a range lying between first and second pixel brightness values; and     actuating at least one pulse within at least one additional pulse width segment to alter the pixel brightness above the second brightness boundary such that the pulses within the additional segments are altered unequally with the additional pulse width segments closest in time to the first segment having a greater total duration of actuated pulses for a given pixel brightness compared to the additional pulse width segments farther in time from the first segment     wheren the pulse width modulated display system displays a colored image by sequentially projecting each of three primary colors and wherein each color comprises a separate sequence of pulse width segments that are interleaved with those of the other primary colors.

2. The method according to claim 1 wherein the pulse width segment first in brightness has a predetermined color.

3. The method according to claim 2 wherein the pulse width segment first in brightness lags a pulse width segment first In time.

4. The method according to claim 3 wherein pulses in the additional segments are altered unequally so that to the total duration of actuated pulses within each of the additional segments prior in time to the first segment taper up towards a midpoint of a picture interval while the total duration of actuated pulses within each of the additional segments subsequent in time to the first segment taper downwards away from the picture interval midpoint.

5. The method according to claim 1 wherein pulses are actuated in the additional segments to minimize redistribution of light upon an incremental change in pixel brightness.

6. A method of operating a pulse width modulated display system that displays color images, the system having a plurality of pixels each of whose illumination for a given one of a set of primary colors is controlled responsive to pulses within a sequence of pulse width segments for that color, with each segment associated with a given color interleaved with the segments associated with other colors, the state of each individual pulse in a segment for that color determining whether the corresponding pixel remains illuminated during the interval associated with that pulse, comprising the steps of:

actuating at least one pulse in a first in brightness pulse width segment for a given color to increase pixel brightness within a range lying between first and second pixel brightness values; and actuating at least one purse within at least one additional pulse width segment to alter the pixel brightness above the second brightness boundary such that the pulses within the additional segments are altered unequally with the additional pulse width segments closest in time to the first segment having a greater total duration of actuated pulses for a given pixel brightness compared to the additional pulse width segments farther in time from the first segment.

7. The method according to claim 6 wherein the pulse width segment first in brightness has a predetermined color.

8. The method according to claim 6 wherein pulses are actuated in the additional segments for that given color to minimize redistribution of light within a frame interval upon an incremental increase in pixel brightness.

* * * * *